May 30, 1967  B. O. N. TENWOLDE  3,322,174
GRAVITY FEED FOOD SLICING MACHINE
Filed Nov. 16, 1964
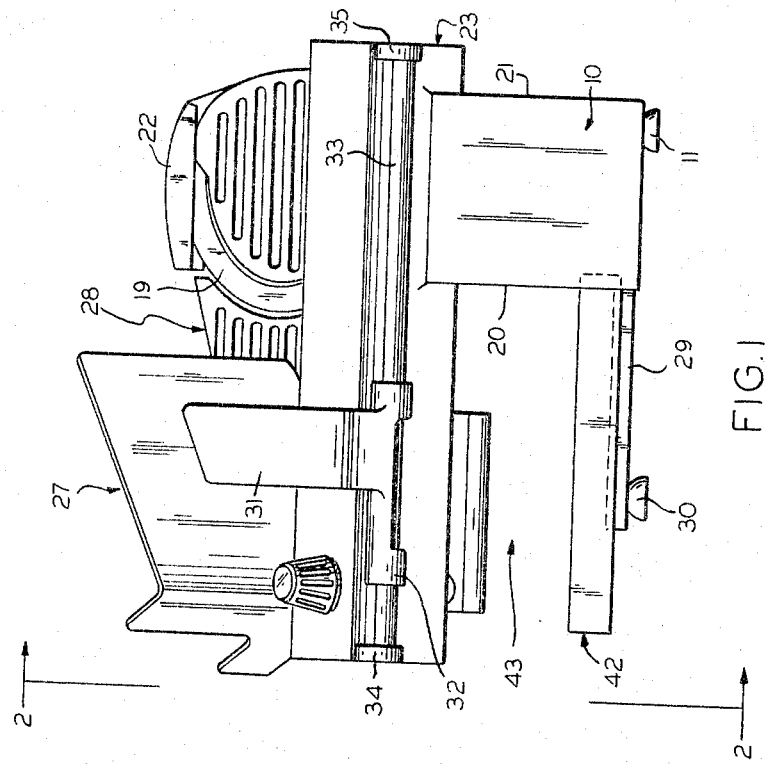
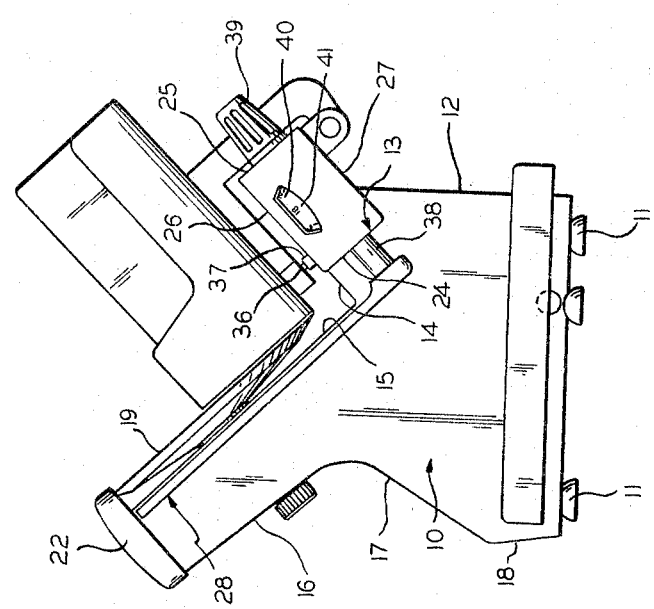
INVENTOR
BERNARDUS O. N. TENWOLDE
BY
Mansell, Johnston, Cook & Root
ATTORNEYS United States Patent Office 3,322,174
Patented May 30, 1967

3,322,174
GRAVITY FEED FOOD SLICING MACHINE
Bernardus O. N. Tenwolde, Schiedam, Netherlands, assignor to Maatschappij Van Berkel's Patent N.V., Rotterdam, Netherlands, a limited-liability company of the Netherlands
Filed Nov. 16, 1964, Ser. No. 411,427
Claims priority, application Germany, Nov. 23, 1963, M 59,025
7 Claims. (Cl. 146—102)

This invention relates in general to a food slicing machine for slicing foodstuffs such as bread, meat or the like, and more particularly to a food slicing machine wherein the food to be sliced is gravity fed to the slicing knife.

Heretofore, it has been customary to provide a free space below the slicing station of a food slicing machine, but in such embodiments the guide for the carriage supporting the food table is mounted at the bottom of the frame and therefore somewhat remote from the location where the food is sliced or remote from the food station. In such an embodiment, a bracket is provided for supporting the carriage and it is difficult to construct the bracket rigid enough, and further it is known that the slide bearings of the carriage have been subjected to high structural demands.

It is therefore an object of the present invention to provide an improved gravity feed food slicing machine that obviates the above named difficulties.

Another object of the present invention resides in the provision of an improved gravity feed food slicing machine wherein a free slice-receiving space is defined below the slicing station.

Still another object of this invention is in the provision of a gravity feed food slicing machine having the provision of a bracket extending laterally from an upstanding frame and being spaced from the supporting surface of the frame, and wherein the food table carriage guide is secured to the bracket to thereby provide a free slice-receiving space below the slicing station.

A still further object of this invention is to provide a gravity feed food slicing machine having a free slice-receiving space arranged below the slicing station and receiving a tray that is open on three sides and easily removable from the machine.

Other objects, features and advantages of the invention will be apparent from the following detailed disclosure, taken in conjunction with the accompanying sheet of drawing, wherein like reference numerals refer to like parts, in which:

FIG. 1 is a front elevational view of a gravity feed food slicing machine in accordance with the invention; and FIG. 2 is a side elevational view of the machine of FIG. 1 and taken substantially along line 2—2 thereof.

Referring now to the drawings, the gravity feed food slicing machine of the present invention includes a main frame 10 upstanding from a surface upon which it is to be supported and being provided at its underside with feet or legs 11 that engage the supporting surface. The frame 10 is provided with a front wall 12 that is substantially vertical, a recessed area extending rearwardly from the front wall and generally designated by the numeral 13, an inclined wall 14 behind the recessed area 13, a second inclined wall 15 extending substantially perpendicular to the inclined wall 14 and extending upwardly and rearwardly, a rear inclined wall 16 that extends substantially parallel to the second inclined wall 15, a second rear inclined wall 17 extending nearly perpendicular to the wall 16, and a lower rear wall 18. The main frame 10 may be considered also as a housing for a motor (not shown) that is suitably connected to a circular knife 19 that is journaled in the main frame 10 and on the second inclined wall 15. As seen particularly in FIG. 1, the circular knife 19 projects over the side 20 of the main frame 10 and even slightly over the opposite side 21.

A sharpener 22 is built in at the upper end of the main frame 10 for sharpening of the circular knife 19. It should be appreciated that the invention may be provided without the built in sharpener if so desired.

A generally rectangularly-shaped and elongated supporting arm 23 is carried at the recess 13 of the main frame 10 and includes opposed parallel sides 24 and 25 and opposed parallel sides 26 and 27. The supporting arm 23 extends primarily laterally of the main frame 10 from the side 20 thereof but also to some extent laterally of the side 21. The portion extending laterally of the side 20 of the frame 10 serves as a cantilever support for the food table 27 and the gauge plate 28. It should also be noticed that the side 27 of the supporting arm 23 projects forward of the vertical wall 12 of the main frame 10.

To provide greater stability to the support of the main frame 10 on a supporting surface, a rod 29 is secured to the lower end of the main frame 10 and extends laterally thereof substantially parallel to the supporting arm 23, both of which extend substantially perpendicular to the sides 20 and 21 of the main frame 10. A foot or leg 30 is provided at the free end of the rod 29 to rest on the supporting surface.

The food table 27 is carried by a bracket 31 that extends from a carriage 32 slidably mounted along a slide bar 33 that is supported at the upper end of the side 27 of the supporting arm 23. The slide bar 33 is supported at opposite ends by flanges 34 and 35. The food table 27 is additionally provided with a roller 36 slidable along a wearing pad or square bar 37 that is mounted on the lower end of the side 26 of the supporting arm 23, whereby the reciprocation of the food table 27 along the supporting arm 23 will carry the foodstuff into and out of the slicing station that is located at the edge of the circular knife 19 extending over the side 20 of the main frame 10.

The gauge plate 28 is mounted in association with the circular knife 19 and provided with a shaft 38 that is adjustably received within the free end of the supporting arm 23.

A knob 39 and associated mechanism of the usual type provides adjustment of the gauge plate 28 relative to the circular knife 19, and an indexing scale 40 in a window 41 serves to indicate the position of the gauge plate relative to the knife blade 19. As can be easily seen, the gauge plate 28 moves toward and away from the circular knife 19 and is always parallel to the slicing plane.

A slice-receiving tray 42 is provided below the slicing station and below the supporting arm 23 for receiving slices of food. This tray is open on three sides and is suitably removably supported from the main frame 10 and on the rod 14.

Thus it is seen that a free slice-receiving space 43 is provided below the slicing station and the supporting arm 23, and the carriage 32 with the guide bar 33 is mounted very close to the food table 37. Thus no high structural demands are made on the slide bearings of the carriage 32 when the carriage is reciprocated by hand on top of the table along the slide bar 33.

It will be understood that modifications and variations may be effected without departing from the scope of the novel concepts of the present invention, but it is understood that this application is to be limited only by the scope of the appended claims.

The invention is hereby claimed as follows:
1. A gravity feed food slicing machine comprising, an upstanding main frame, an inclined circular knife journaled on said frame and extending over at least one side thereof to define a slicing station, an arm extending along an axis parallel to the slicing plane and laterally from said main frame in the direction that the knife extends over the side of the frame and being spaced above the supporting surface of the frame to define a free slice-receiving space below the slicing station, said arm being supported and connected solely at one end thereof by said main frame, an inclined food table reciprocably mounted on said arm and having a food supporting surface extending perpendicular to said knife, and a gauge plate coacting with said table and knife to control the slice thickness.

2. The combination as defined in claim 1, and a supporting rod extend from the bottom of the frame and under the arm.

3. The combination as defined in claim 1, and a slice receiving tray positioned below said slicing station that is open on three sides.

4. A gravity feed food slicing machine comprising, an upstanding main frame, an inclined circular knife journaled on said frame and extending over at least one side thereof to define a slicing station, a supporting arm extending laterally from said main frame in the direction that the knife extends over the side of the frame and being spaced above the supporting surface of the frame to define a free slice-receiving space below the slicing station, said supporting arm extending along an axis parallel to the slicing plane and being rectangular in cross-section wherein two opposed sides thereof extend perpendicular to the slicing plane and two opposed sides extend parallel to the slicing plane, a slide bar carried on the side remote from the knife and extending perpendicular to the slicing plane, a wear pad on the side nearest the knife and extending perpendicular to the slicing plane, a food supporting means slidably supported on said wear pad and slide bar to advance food toward and away from the knife, and a gauge plate coacting with said table and knife to control slice thickness.

5. A gravity feed food slicing machine comprising, an upstanding main frame, an inclined circular knife journaled on said frame and extending over at least one side thereof to define a slicing station, a supporting arm extending laterally from said main frame in the direction that the knife extends over the side of the frame and being spaced above the supporting surface of the frame to define a free slice-receiving space below the slicing station, said supporting arm extending along an axis parallel to the slicing plane and being rectangular in cross-section wherein two opposed sides thereof extend perpendicular to the slicing plane and two opposed sides extend parallel to the slicing plane, a slide bar carried on the side remote from the knife and extending perpendicular to the slicing plane, a wear pad on the side nearest the knife and extending perpendicular to the slicing plane, a food supporting table having a slide engaging said slide bar and a roller engaging said wear pad, wherein said table advances food toward and away from the knife, and a gauge plate coacting with said table and knife to control slice thickness.

6. A gravity feed food slicing machine comprising, an upstanding main frame, an inclined circular knife journaled on said frame and extending over at least one side thereof to define a slicing station, a supporting arm extending laterally from said main frame in the direction that the knife extends over the side of the frame and being spaced about the supporting surface of the frame to define a free slice-receiving space below the slicing station, said supporting arm extending along an axis parallel to the slicing plane and being rectangular in cross-section wherein two opposed sides thereof extend perpendicular to the slicing plane and two opposed sides extend parallel to the slicing plane, a slide bar carried on the side remote from the knife and extending perpendicular to the slicing plane, a wear pad on the side nearest the knife and extending perpendicular to the slicing plane, a food supporting table having a slide engaging said slide bar and a roller engaging said wear pad, wherein said table advances food toward and away from the knife, a gauge plate coacting with said table and knife to control the slice thickness, and means for adjustably mounting said gauge plate adjacent the free end of said supporting arm.

7. The combination as defined in claim 6, and a supporting rod extending laterally from said frame at the bottom thereof and in parallel relation to said supporting arm.

References Cited

UNITED STATES PATENTS

| | | | |
|---|---|---|---|
| 1,926,828 | 9/1933 | Van Berkel | 146—102.11 |
| 1,979,848 | 11/1934 | Streckfuss | 146—102.7 |
| 2,167,015 | 7/1939 | Waage | 146—102.7 |
| 2,438,937 | 4/1948 | Metzler | 146—102.7 XR |
| 3,140,649 | 7/1964 | Bacque | 146—102.7 XR |

DONALD R. SCHRAN, *Primary Examiner.*